(12) United States Patent
Inokuchi et al.

(10) Patent No.: US 7,169,507 B2
(45) Date of Patent: Jan. 30, 2007

(54) MANGANESE DRY BATTERY

(75) Inventors: Koji Inokuchi, Ashiya (JP); Ryohei Ashihara, Neyagawa (JP); Keiji Ogino, Katano (JP); Isao Kubo, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 434 days.

(21) Appl. No.: 10/467,796

(22) PCT Filed: Mar. 25, 2002

(86) PCT No.: PCT/JP02/02868

§ 371 (c)(1),
(2), (4) Date: Aug. 12, 2003

(87) PCT Pub. No.: WO02/084762

PCT Pub. Date: Oct. 24, 2002

(65) Prior Publication Data

US 2004/0062984 A1 Apr. 1, 2004

(30) Foreign Application Priority Data

Apr. 11, 2001 (JP) .............................. 2001-112922

(51) Int. Cl.
*H01M 2/08* (2006.01)
(52) U.S. Cl. .................. 429/171; 429/166; 429/174; 429/172; 429/173; 429/181; 429/185
(58) Field of Classification Search ................ 429/174, 429/166, 171, 172, 173, 181, 185, 224
See application file for complete search history.

(56) References Cited

U.S. PATENT DOCUMENTS 5,595,836 A * 1/1997 Tano et al. ................. 429/166

FOREIGN PATENT DOCUMENTS

| JP | 53-64726 | 6/1978 |
| JP | 54-87825 | 7/1979 |
| JP | 01-73753 | 5/1989 |
| JP | 07-320703 | 12/1995 |
| JP | 08-339786 | 12/1996 |
| JP | 09-237616 | 9/1997 |
| JP | P2000-315486 | 11/2000 |
| WO | WO01/71828 | * 9/2001 |

* cited by examiner

*Primary Examiner*—Susy Tsang-Foster
*Assistant Examiner*—Tony Chuo
(74) *Attorney, Agent, or Firm*—McDermott Will & Emery LLP

(57) ABSTRACT

A manganese dry battery with excellent leak-proof property is provided, in which electrolyte leakage does not occur even if the size of a positive electrode material mixture is increased to meet a demand for improvement in discharge property. In a sealing part, a first circular projection, a second circular projection and a third circular projection are arranged at the bottom in sequence from the center to the outside, and a positive electrode carbon rod supporting part is provided in an innermost periphery portion to have an interval from the first circular projection. A groove between the first projection and the carbon rod is formed to have a substantially rectangular vertical section, kraft board is pressed by flat bottom surfaces of the first and second projections and an opening of the zinc can is fitted between the second and third projections.

1 Claim, 4 Drawing Sheets

MANGANESE DRY BATTERY

TECHNICAL FIELD

The present invention relates to a manganese dry battery using a sealing part of an improved shape.

BACKGROUND ART

FIG. 1 is a front view of a conventional manganese dry battery, partially in cross section. As shown in FIG. 1, in the conventional manganese dry battery, a separator 3 is positioned inside of a negative electrode zinc can 6, in which a positive electrode material mixture 2 is inserted. A top surface of the positive electrode material mixture 2 is covered with kraft board 5 having an aperture in the center for inserting therein a positive electrode carbon rod 1, and the carbon rod 1 is inserted in the center. This manganese dry battery includes bottom paper 4, a negative electrode terminal plate 8, a seal ring 9, a heat-shrinkable tube 10, a positive electrode terminal plate 11, an insulating ring 12 and an outer jacket can 13.

In order to block (seal) the inside of the dry battery from the outside, the carbon rod 1 is inserted in an aperture of a sealing part 7 made of a thermoplastic resin such as polyethylene so that the both are held firmly and hermetically and an opening or an opening edge of the negative electrode zinc can 6 is engaged into the sealing part 7 to establish a fit between them.

Further, a sealant 14 such as asphalt or polybutene is applied to a part where the sealing part 7 holds the carbon rod 1 and a part where the sealing part 7 is fitted with the negative electrode zinc can 6 to ensure the sealing.

However, if the filling amount of the positive electrode material mixture 2 is increased to improve discharge property, the positive electrode material mixture 2 in the battery increases in height. Then, the kraft board 5 positioned on the top surface of the positive electrode material mixture 2 approaches the sealing part 7 and may come into contact with the sealing part 7 as shown in FIG. 2 if the positive electrode material mixture 2 expands during storage or discharge of the battery. FIG. 2 is a front view of another conventional manganese dry battery, partially in section.

Then, due to the contact between the kraft board 5 and the sealing part 7, a sealant 14' applied into a groove lying in an innermost periphery portion of the sealing part 7 and between the sealing part 7 and the positive electrode carbon rod 1 is absorbed into the kraft board 5. The groove has a substantially triangular shape in vertical section and is filled with the sealant 14'.

There are lots of microscopic asperities on the surface of the positive electrode carbon rod 1. Accordingly, if the sealant 14' is absorbed into the kraft board 5, there arise problems in that a degree of sealing is reduced and an electrolyte may possibly leak out of the battery.

The opening of the negative electrode zinc can 6 is fitted with an outer periphery portion (outer side portion) of the sealing part 7 as shown in FIG. 2, with certain space kept between the kraft board 5 and the outer periphery portion even if the kraft board 5 contacts the sealing part 7. However, in the case where the positive electrode material mixture 2 expands as described above to bring the kraft board 5 into contact with the outer periphery portion of the sealing part 7 fitted with the opening of the negative electrode zinc can 6, a sealant 14" applied to the fit portion is also absorbed into the kraft board 5. As a result, as in the case of the part between the positive electrode carbon rod 1 and the sealing part 7, the electrolyte may leak from a gap between the opening of the negative electrode zinc can 6 and the sealing part 7.

In view of these problems, an object of the present invention is to provide a manganese dry battery with excellent leak-proof property, in which the shape of the sealing part is improved such that leakage of the electrolyte does not occur even if the size of the positive electrode material mixture is increased to meet a demand for improvement in discharge property.

DISCLOSURE OF INVENTION

To solve the above-described problems, the present invention relates to a manganese dry battery comprising a separator positioned inside of a negative electrode zinc can, a positive electrode material mixture inserted therein, kraft board having an aperture in the center into which the positive electrode carbon rod is inserted and covering a top surface of the positive electrode material mixture and a sealing part sealing an opening of the zinc can with the positive electrode carbon rod inserted into the center, wherein the sealing part includes a circular projection at the bottom for pressing the kraft board.

More specifically, the manganese dry battery is characterized in that the sealing part includes a first circular projection and a second circular or substantially circular projection arranged at the bottom in sequence from the center to the outside, a positive electrode carbon rod supporting part provided inside of the first circular projection in an innermost periphery portion and a groove formed between the first circular projection and the positive electrode carbon rod.

It is preferred that the manganese dry battery includes a third circular projection provided outside of the second circular or substantially circular projection and the opening of the negative electrode zinc can is fitted between the second circular projection and the third circular projection.

That is, more preferably, the sealing part includes a first circular projection, a second circular or substantially circular projection and a third circular projection which are arranged at the bottom in sequence from the center to the outside, a positive electrode carbon rod supporting part provided inside of the first circular projection in an innermost periphery portion and a groove having a substantially rectangular vertical section formed between the first circular projection and the positive electrode carbon rod. The groove preferably has a vertical section, such as a rectangle, that can create sufficient space for effectively holding the sealant.

Further, it is preferred that the bottom surfaces of the first circular projection and the second circular or substantially circular projection press the kraft board and the opening of the zinc can is fitted between the second circular or substantially circular projection and the third circular projection.

BEST MODE FOR CARRYING OUT THE INVENTION

The present invention relates to a manganese dry battery comprising a negative electrode zinc can, a separator positioned inside of the negative electrode zinc can, a positive electrode material mixture positioned inside of the separator, a positive electrode carbon rod, kraft board having an aperture in the center into which the positive electrode carbon rod is inserted and covering a top surface of the positive electrode material mixture and a sealing part having an aperture in the center into which the positive electrode carbon rod is inserted and sealing an opening of the negative electrode zinc can, wherein the sealing part includes at the bottom a circular projection for pressing the kraft board.

First, it is preferred that the sealing part includes a first circular projection and a second circular or substantially circular projection arranged at the bottom in sequence from the center to the outside, a positive electrode carbon rod supporting part provided inside of the first circular projection in an innermost periphery portion and a groove formed between the first circular projection and the positive electrode carbon rod.

Further, it is preferred that the manganese dry battery includes a third circular projection provided outside of the second circular or substantially circular projection and the opening of the negative electrode zinc can is fitted between the second circular or substantially circular projection and the third circular projection.

Most preferably, the sealing part includes a first circular projection, a second circular or substantially circular projection and a third circular projection which are arranged at the bottom in sequence from the center to the outside, a positive electrode carbon rod supporting part provided inside of the first circular projection in an innermost periphery portion and a groove formed between the first circular projection and the positive electrode carbon rod. Further, it is preferred that the bottom surfaces of the first circular projection and the second circular or substantially circular projection press the kraft board and the opening of the negative electrode zinc can is fitted between the second circular or substantially circular projection and the third circular projection.

Figure 3:
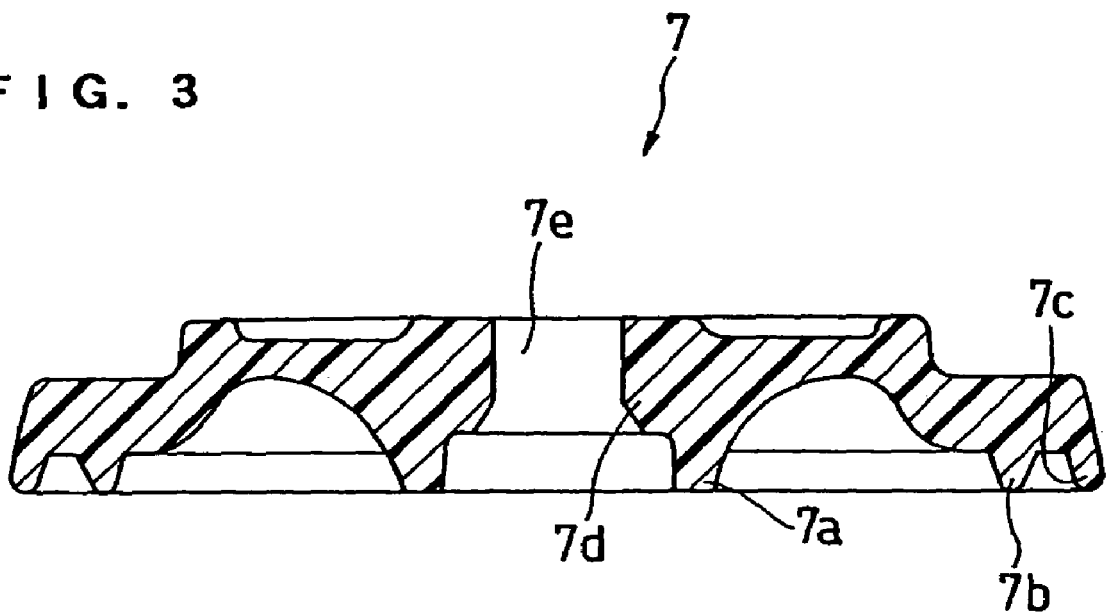
FIG. 3 is a schematic vertical section of a sealing part to be applied to a manganese dry battery according to the present invention.

FIG. 3 shows a schematic vertical section of a sealing part 7 to be applied to the manganese dry battery of the present invention.

As seen in FIG. 3, the sealing part 7 includes a first circular projection 7a, a second circular projection 7b and a third circular projection 7c which are arranged at the bottom in sequence from the center to the outside. In the innermost periphery portion, a positive electrode carbon rod supporting part 7d is provided inside of the first circular projection 7a to have a clearance therefrom. In the center, an aperture 7e for inserting therein a positive electrode carbon rod is provided.

Figure 4:
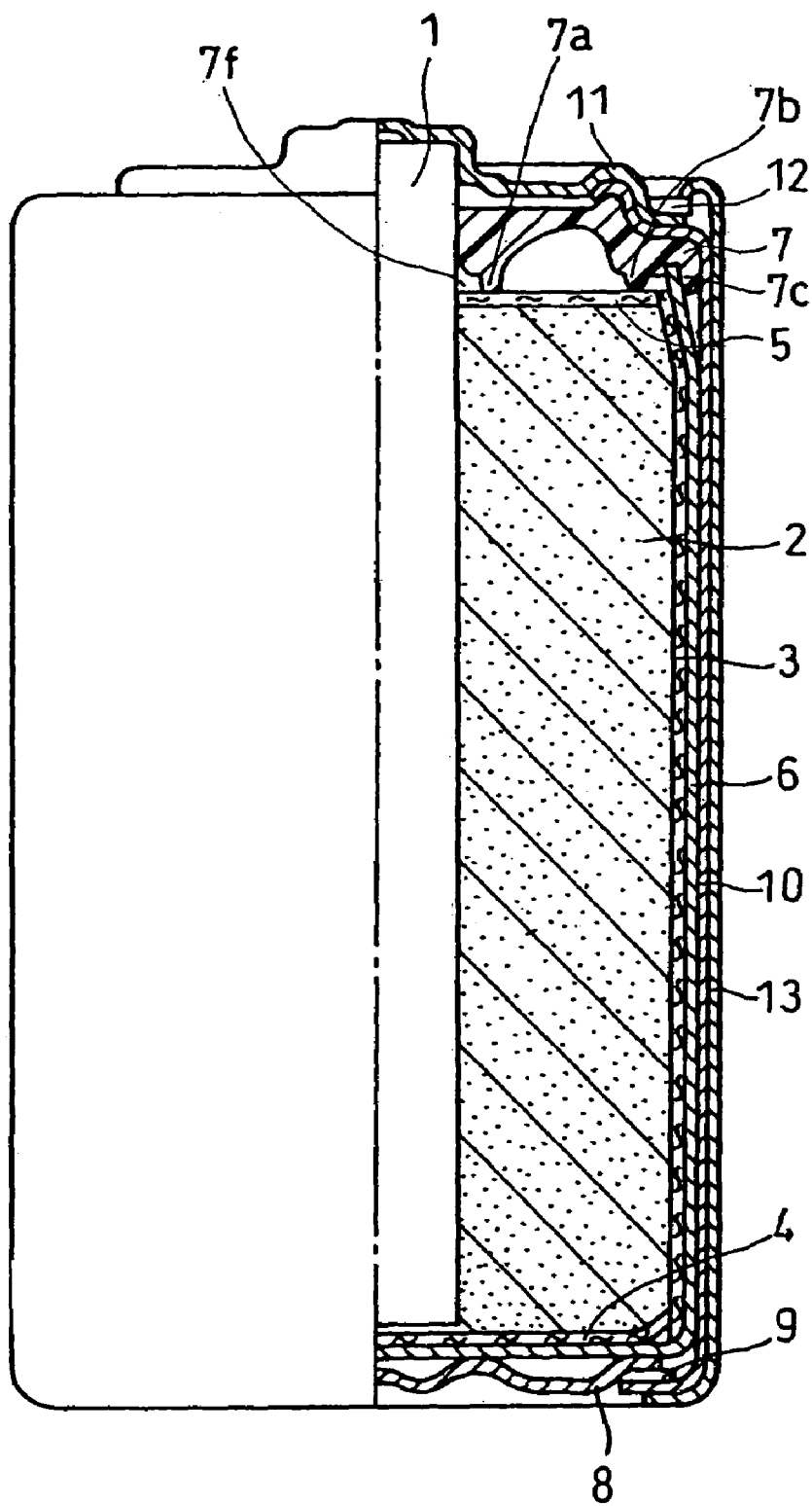
FIG. 4 is a front view, partially in section, of a manganese dry battery to which the sealing part of the present invention shown in FIG. 3 is applied.

FIG. 4 shows a front view, partially in section, of the manganese dry battery to which the sealing part 7 of the present invention shown in FIG. 3 is applied.

Figure 1:
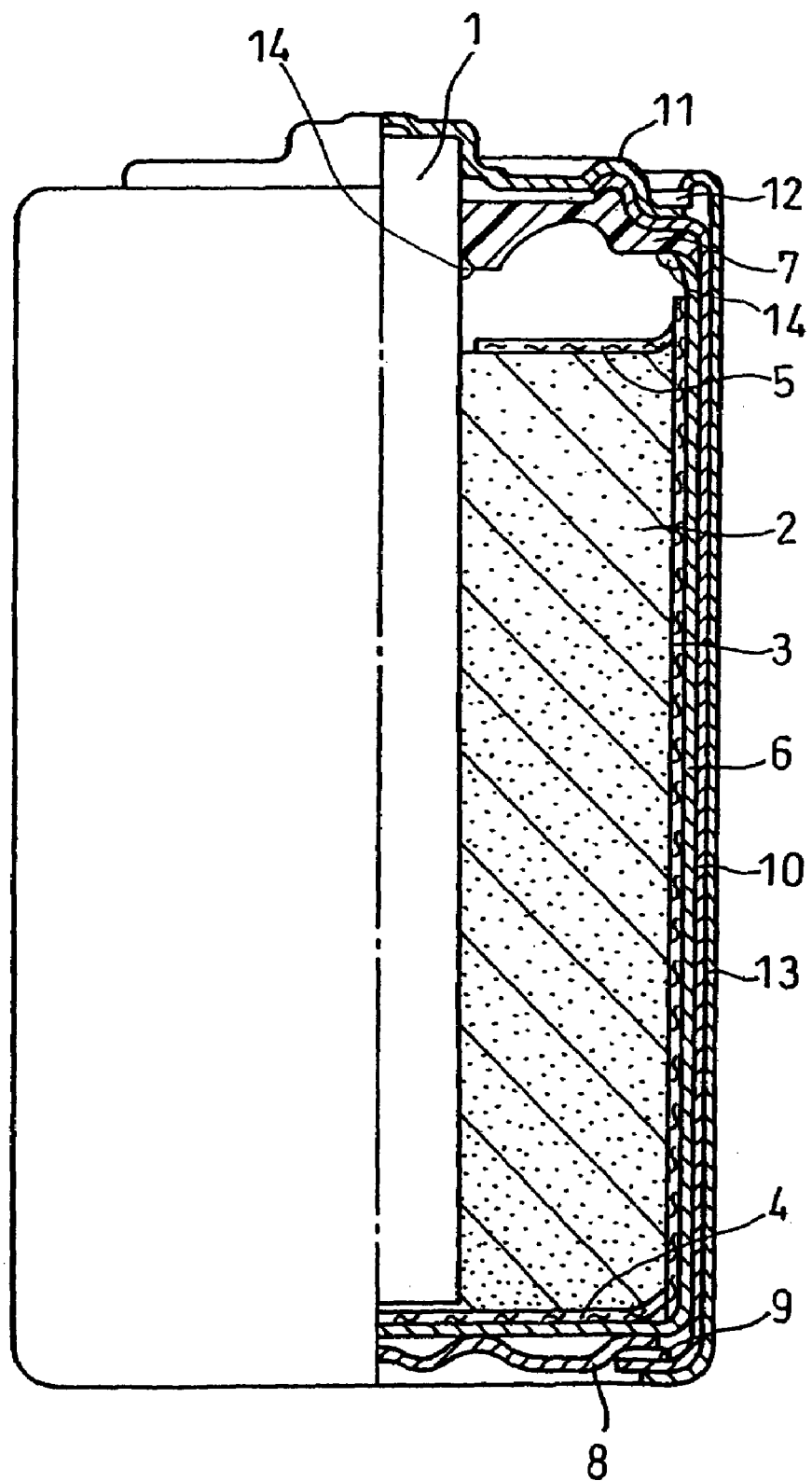
FIG. 1 is a front view of a conventional manganese dry battery, partially in section.
Figure 2:
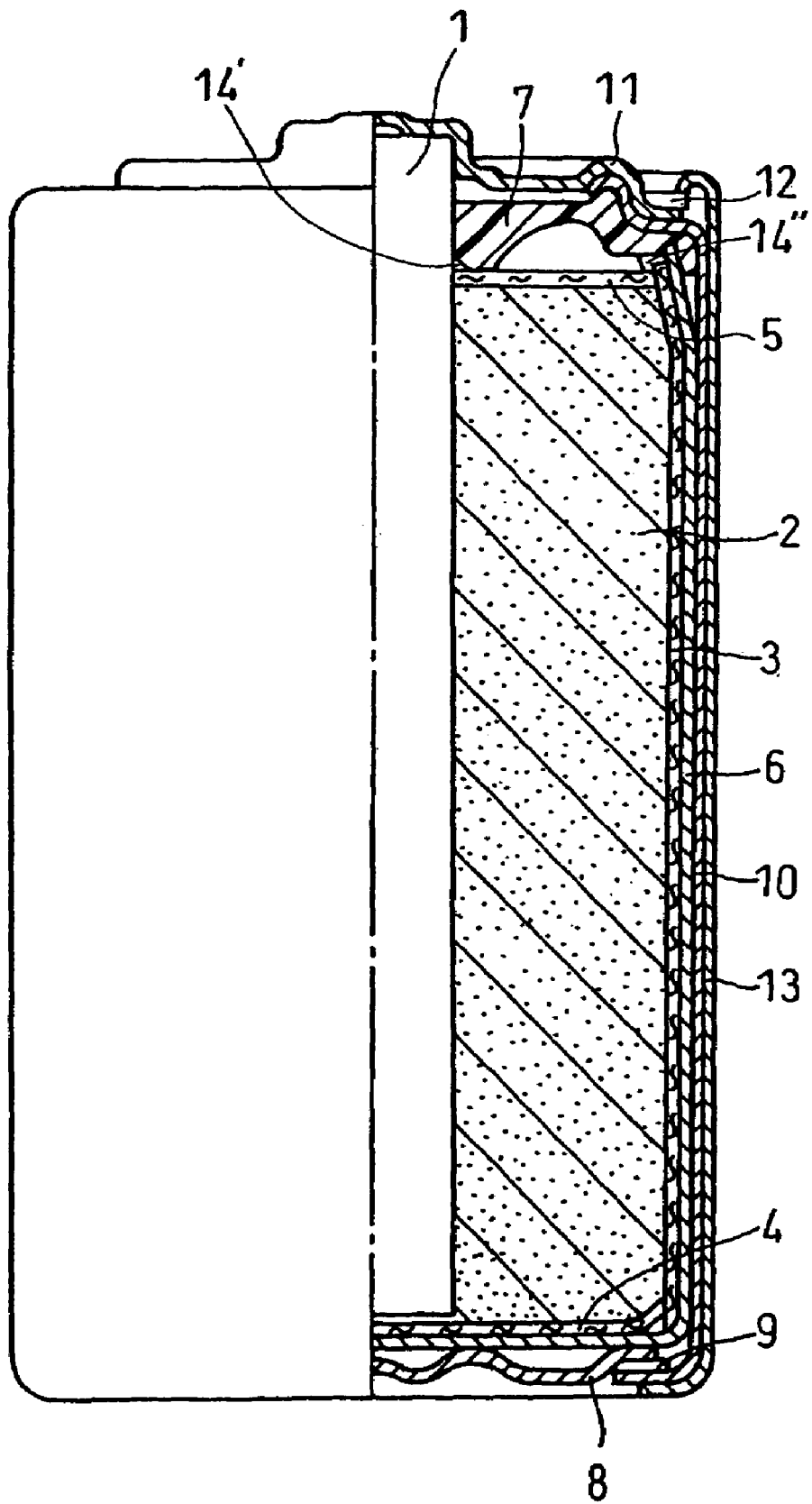
FIG. 2 is a front view of another conventional manganese dry battery, partially in section.

In the manganese dry battery shown in FIG. 4, in the same manner as in the manganese dry batteries of FIGS. 1 and 2, a separator 3 is positioned inside of a negative electrode zinc can 6, a positive electrode material mixture 2 is inserted in the separator 3 and a top surface of the positive electrode material mixture 2 is covered with kraft board 5 having an aperture (not shown) in the center for inserting therein a positive electrode carbon rod 1. With the positive electrode carbon rod 1 inserted in the center, an opening of the negative electrode zinc can 6 is sealed with the sealing part 7.

In particular, with the use of the sealing part 7 shown in FIG. 3, bottom end surfaces of the first and second circular projections 7a and 7b press the kraft board 5, respectively, and the opening of the negative electrode zinc can 6 is fitted between the second and third circular projections 7b and 7c. A sealant is applied to the fit portion (not shown). Further, a groove 7f having a substantially rectangular vertical section is formed between the first circular projection 7a and the positive electrode carbon rod 1, into which the sealant is also applied. In FIG. 4, the sealant is omitted.

As described above, since the groove 7f is provided between the positive electrode carbon rod 1 and the first circular projection 7a of the sealing part 7, the sealant can be applied in a greater amount than before. This improves sealing performance and surely prevents the leakage of the electrolyte. Further, by avoiding the ascension of the kraft board 5 with the second circular projection 7b, the sealing performance is improved and the electrolyte leakage is prevented.

In addition, the existence of the second circular projection 7b is also effective in the case where the opening of the negative electrode zinc can 6 is low in strength. The reason is that the deformation of the opening of the negative electrode zinc can 6 in fitting the sealing part 7 into the negative electrode zinc can 6 is prevented by fitting the opening of the negative electrode zinc can 6 between the second circular projection 7b and the third circular projection 7c. Further, if the opening of the negative electrode zinc can 6 is surely fitted between the second and third circular projections 7b and 7c, are prevented loosening of the engagement between the opening edge of the negative electrode zinc can 6 and the sealing part 7, as well as the deterioration of the sealing performance.

Further, the first and second circular projections 7a and 7b also prevent the expansion of the positive electrode material mixture 2 during discharge, thereby preventing the generation of a clearance in the positive electrode material mixture 2 and inhibiting the reduction of reaction efficiency.

The manganese dry battery according to the present invention is particularly characterized by the shape of the sealing part 7 and can be manufactured by a conventional method. Especially, as a material for the sealing part 7, are listed polyethylene, polypropylene and polyamide such as nylon or a mixture thereof, for example. For the other battery components, conventional materials are used.

Hereinafter, the present invention will be explained in detail by way of examples, but the present invention is not limited thereto.

EXAMPLE

In this example, a manganese dry battery of the present invention having a structure shown in FIG. 4 was fabricated. First, a sealing part 7 having a structure shown in FIG. 3 was made by injection molding using polyethylene.

Then, bottom paper 4 made of kraft board was placed on the bottom of the negative electrode zinc can 6, in which was arranged a separator 3 prepared by applying to kraft board adhesive paste of high water retention predominantly made of starch. Further, inside the separator 3, a positive electrode material mixture 2 prepared by mixing manganese dioxide, a conductive material and an electrolyte was inserted. Then, the top surface of the positive electrode material mixture 2 was covered with kraft board 5 made of kraft board having an aperture in the center for inserting a positive electrode carbon rod 1.

On the other hand, the positive electrode carbon rod 1 was inserted into the sealing part 7 and asphalt was applied as a sealant into a groove 7f having a substantially rectangular vertical section formed between the first circular projection 7a and the carbon rod 1.

The sealing part 7 with the positive electrode carbon rod 1 inserted in the center was inserted into the negative electrode zinc can 6 and an opening of the negative electrode zinc can 6 was fitted between the second and third circular projections 7b and 7c such that the bottom end surfaces of the first and second circular projections 7a and 7b pressed the kraft board 5. At that time, part of the positive electrode carbon rod 1 projecting from the sealing part 7 was connected to a positive electrode terminal plate 11 covering the top surface of the sealing part 7. On the other side, a negative electrode terminal plate 8 was connected to the bottom of the negative electrode zinc can 6.

The outer side surface of the negative electrode zinc can 6 was covered with an insulating heat-shrinkable tube 10 made of polyvinyl chloride. The heat-shrinkable tube 10 also covered an outer periphery portion of the sealing part 7 and the seal ring 9, and at the same time, served to fix the sealing part 7, the negative electrode terminal plate 8 and the seal ring 9.

Further, the exposed surface of the heat-shrinkable tube 10 was covered with an outer jacket can 13. An upper end of the outer jacket can 13 was caulked to the periphery of the positive electrode terminal plate 11 via an insulating ring 12 and a lower end of the outer jacket can 13 was caulked to the periphery of the negative electrode terminal plate 8 via a lower end of the heat-shrinkable tube 10 and the seal ring 9.

Thus, a manganese dry battery A according to the present invention was fabricated.

COMPARATIVE EXAMPLE

A manganese dry battery B for comparison was manufactured in the same manner as the above-described example except that the sealing part 7 was shaped as shown in FIG. 1.

[Evaluation]

The manganese dry batteries A and B fabricated in the above-described manner were evaluated as follows. The results are shown in Table 1.

(i) A circuit voltage was measured after storage at 45° C. for 3 months to obtain a difference from a circuit voltage in an initial state (immediately after assembling) as an average drop in voltage (ΔmV) (n=50).

(ii) The rate of corrosion of the positive electrode terminal plate 11 caused by electrolyte leakage was visually checked after storage at 60° C. for 3 months (n=50).

(iii) The batteries were continuously discharged immediately after the fabrication under a load of 2.2Ω to pace off time until a final voltage reaches 0.9 V to check continuous discharge performance (n=10).

TABLE 1

| | Average drop in voltage (ΔmV) | Corrosion rate of the positive electrode terminal plate (%) | Continuous discharge performance (min) |
| --- | --- | --- | --- |
| Example | 20 | 0 (0/50) | 600 |
| Comparative Example | 37 | 16 (8/50) | 588 |

The results shown in Table 1 indicate that, in Example, the first circular projection 7a and the second circular projection 7b of the sealing part 7 surely press the kraft board 5 and hold the sealant 14.

On the other hand, in Comparative Example, the kraft board 5 contacts the sealing part 7 due to the expansion of the positive electrode material mixture 2, which results in poor leak-proof property.

INDUSTRIAL APPLICABILITY

According to the present invention, a manganese dry battery with excellent leak-proof property is provided without causing electrolyte leakage even if the size of a positive electrode material mixture is increased to meet a demand for improvement in discharge property.

The invention claimed is:

1. A manganese dry battery comprising a negative electrode zinc can, a separator positioned inside of the negative electrode zinc can, a positive electrode material mixture positioned inside of the separator, a positive electrode carbon rod, kraft board having an aperture in the center into which the positive electrode carbon rod is inserted and covering a top surface of the positive electrode material mixture and a sealing part having an aperture in the center into which the positive electrode carbon rod is inserted and sealing an opening of the negative electrode zinc can,
wherein the sealing part includes
a first circular projection pressing said kraft board, a second circular or substantially circular projection pressing said kraft board arranged at the bottom in sequence from the center to the outside, and a third circular projection provided outside of the second circular or substantially circular projection;
a positive electrode carbon rod supporting part provided inside of the first circular projection in an innermost periphery portion; and
a groove formed between the first circular projection and the positive electrode carbon rod,
wherein an opening of the negative electrode zinc can is fitted between the second circular or substantially circular projection and the third circular projection.

* * * * *